(12) United States Patent
Siminoff

(10) Patent No.: US 7,969,874 B2
(45) Date of Patent: Jun. 28, 2011

(54) MULTIPLE PACKET ROUTING SYSTEM (MPRS)

(75) Inventor: James Wyatt Siminoff, Chester, NJ (US)

(73) Assignee: NobelBiz, Inc., Carlsbad, CA (US)

( * ) Notice: Subject to any disclaimer, the term of this patent is extended or adjusted under 35 U.S.C. 154(b) by 0 days.

(21) Appl. No.: 12/287,304

(22) Filed: Oct. 8, 2008

(65) Prior Publication Data

US 2009/0086624 A1    Apr. 2, 2009

Related U.S. Application Data

(62) Division of application No. 10/835,842, filed on Apr. 29, 2004, now abandoned.

(60) Provisional application No. 60/466,381, filed on Apr. 29, 2003, provisional application No. 60/518,599, filed on Nov. 7, 2003.

(51) Int. Cl.
*H04J 1/16* (2006.01)
*H04L 12/56* (2006.01)

(52) U.S. Cl. .......................... 370/230; 370/252; 370/464

(58) Field of Classification Search .................. 370/252, 370/230, 464
See application file for complete search history.

(56) References Cited

U.S. PATENT DOCUMENTS

| | | | | |
|---|---|---|---|---|
| 5,841,673 | A * | 11/1998 | Kobayashi et al. | 716/6 |
| 7,233,568 | B2 * | 6/2007 | Goodman et al. | 370/218 |
| 7,269,157 | B2 | 9/2007 | Klinker | |
| 7,289,436 | B2 * | 10/2007 | Schaller et al. | 370/225 |
| 2010/0061228 | A1 * | 3/2010 | Grabelsky et al. | 370/221 |

OTHER PUBLICATIONS

Mar. 23, 2010 Office Action issued in related U.S. Appl. No. 12/287,305.
Sep. 2, 2010 Office Action Issued in Related U.S. Appl. No. 12/284,305.
Jul. 21, 2010 Office Action issued in related U.S. Appl. No. 12/287,304.
Jul. 21, 2010 Office Action issued in U.S. Appl. No. 12/287,304.

* cited by examiner

*Primary Examiner* — John Pezzlo

(57) ABSTRACT

A method and system for Multiple Packet Routing is disclosed. A characteristic of a network may be monitored. Based on the characteristic, a network path of two or more redundant call streams sent from a first endpoint to a second endpoint may be controlled.

6 Claims, 7 Drawing Sheets

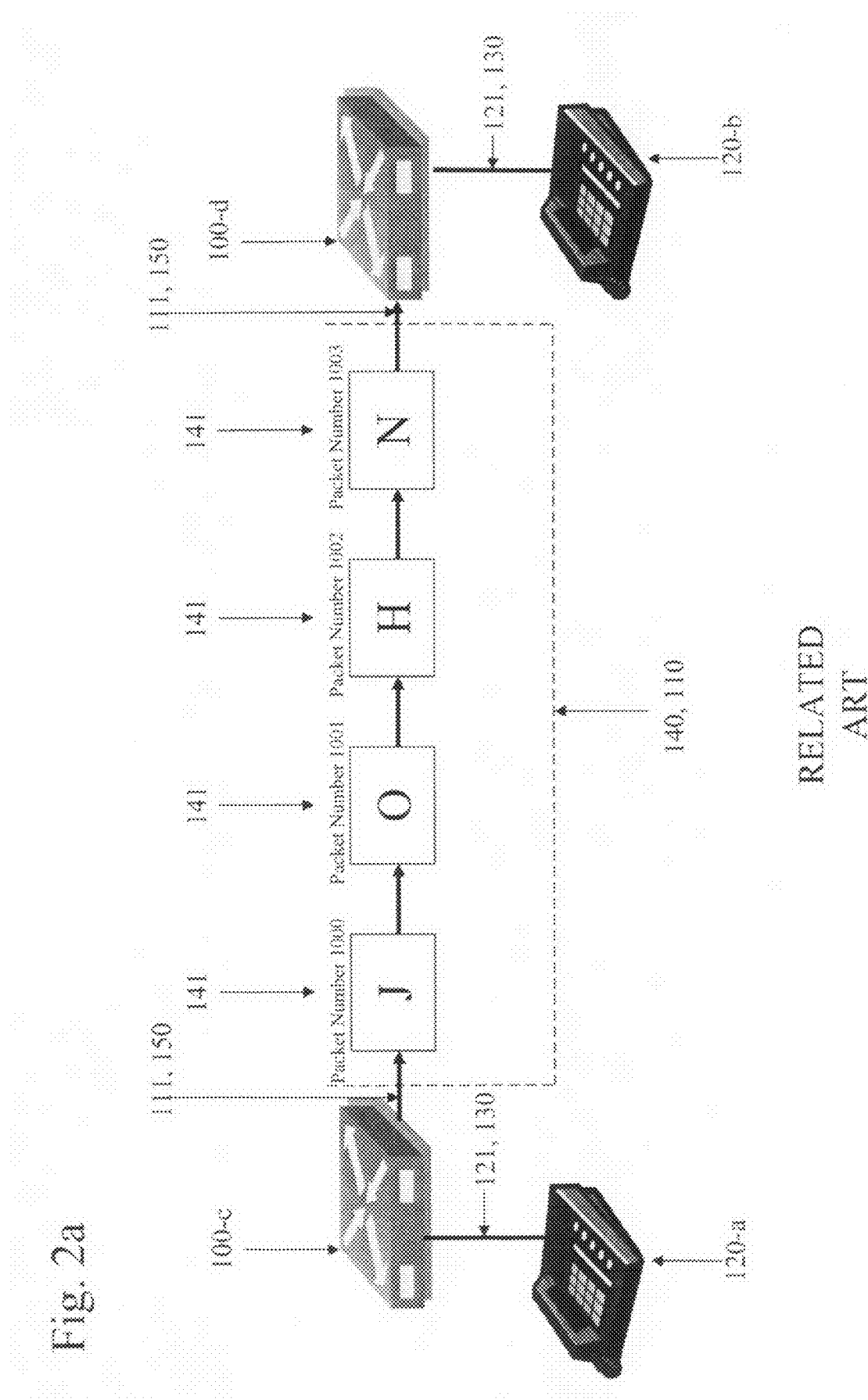

MULTIPLE PACKET ROUTING SYSTEM (MPRS)

This application is a divisional of U.S. patent application Ser. No. 10/835,842, filed Apr. 29, 2004 now abandoned, which claims priority from provisional applications U.S. Ser. No. 60/466,381 filed on Apr. 29, 2003 and U.S. Ser. No. 60/518,599 filed on Nov. 7, 2003, each of which is hereby incorporated by reference.

BACKGROUND OF THE INVENTION

Voice Over Internet Protocol (VOIP) is a method for transmitting voice communication between devices through the internet. It has gained significant ground in many areas of voice transmission as it is a more efficient way of transmitting voice signals. Varying levels of compression or CODECs are used, most of which are standards such as G.729, G.723, GSM, ADPCM and others specified by the International Telephony Union (ITU).

VOIP works by taking sound and breaking that sound into digital packets. Those digital packets are transmitted to a location (based on external information transmitted as part of a call), and a receiving side translates those digital packets back into sound. Thus, each packet includes routing and sequence information. A call, or call stream, happens by doing this in two directions (duplex) between two endpoint devices.

At present, there are many VOIP equipment manufacturers worldwide including Cisco, Vocal-Tec, Clarent, Quintum, Nuera and others, which develop different types and variations of devices to transmit VOIP. Some of the manufacturers use proprietary CODECs while others use standard CODECs. Some inter-operate with other companies gateways with the most common interoperability happening with Cisco equipment, which has the largest installed base of VOIP equipment worldwide.

All of the VOIP worldwide currently is transmitted as a single call stream from one endpoint to another. There are no services which send multiple call streams of the same call through different networks or the same network in order to have an inventory of duplicate packets, thus providing an added layer of quality control by routing the call through separate environments. The inventory created by sending the same packets through multiple call streams and multiple networks allows the receiving VOIP gateway to replace a lost packet, which may occur due to internet packet loss or packets received out of order, with a duplicate of the same packet out of its inventory. This also gives the VOIP Gateway redundancy if one network is affected by a transmission interruption issue. It is unlikely for two or more separate networks not affiliated with each other at any point to go down at the same time for the same reason. Thus, by sending the same packet over multiple networks the chance of a successful call flow is statistically much higher.

There are companies which have developed different degrees of lost packet replacement methods using algorithms to predict what the lost packet would sound like (or, for non-voice packets, what information that packet would contain) based on the bordering packets (the packets before and after the lost packet). What is different with multiple call streams through multiple networks is that the endpoint may replace the lost packet with a duplicate packet from a second, third, or as many call streams through as many networks as the packets were sent. This allows the VOIP gateways to supply the end users with the full and complete call without any missing portions. The number of call streams provided may be based on the amount of actual or predicted packet loss over the network and other factors, such as whether the lost packets for a data stream occur as a percentage of the total number of packets (i.e. 1 in 10), or whether the lost packets occur in strings in a portion of the stream. The number of networks may be based on the degree in which the network operator wishes to insure quality on the call. Furthermore, with multiple network paths, the call set-up may be on one or both sides of the network.

The multiple call streams through multiple networks may work by using some of the existing CODECs or proprietary CODECs used in VOIP transmission. The software may be set to send the same call multiple times through any number of networks and tag each packet so that the same packet on each call stream is identifiable. In the case of a packet not being delivered, the system is able to identify a duplicate of that packet in another call stream. The physical layer of aspects of the invention may route multiple packets through various diverse paths or the same path. The amount of bandwidth and processing power used may be increased on a per-call basis, as compared to single-stream systems, as the endpoints may send the call multiple times at the same time and may need to handle multiple network interfaces. With this method of sending multiple packets, if all networks are running with perfect quality, then a network monitor providing routing intelligence may turn off the multiple packets without affecting the call transmission quality as the gateways are able to accept any number of call streams including one and still complete the call.

SUMMARY OF THE INVENTION

A method and system for Multiple Packet Routing is disclosed. A characteristic of a network may be monitored. Based on the characteristic, a network path of two or more redundant call streams sent from a first endpoint to a second endpoint may be controlled.

BRIEF DESCRIPTION OF THE DRAWINGS

FIG. 2a is a diagram showing a standard VOIP packet call flow.

DETAILED DESCRIPTION OF THE DRAWINGS

Figure 1A:
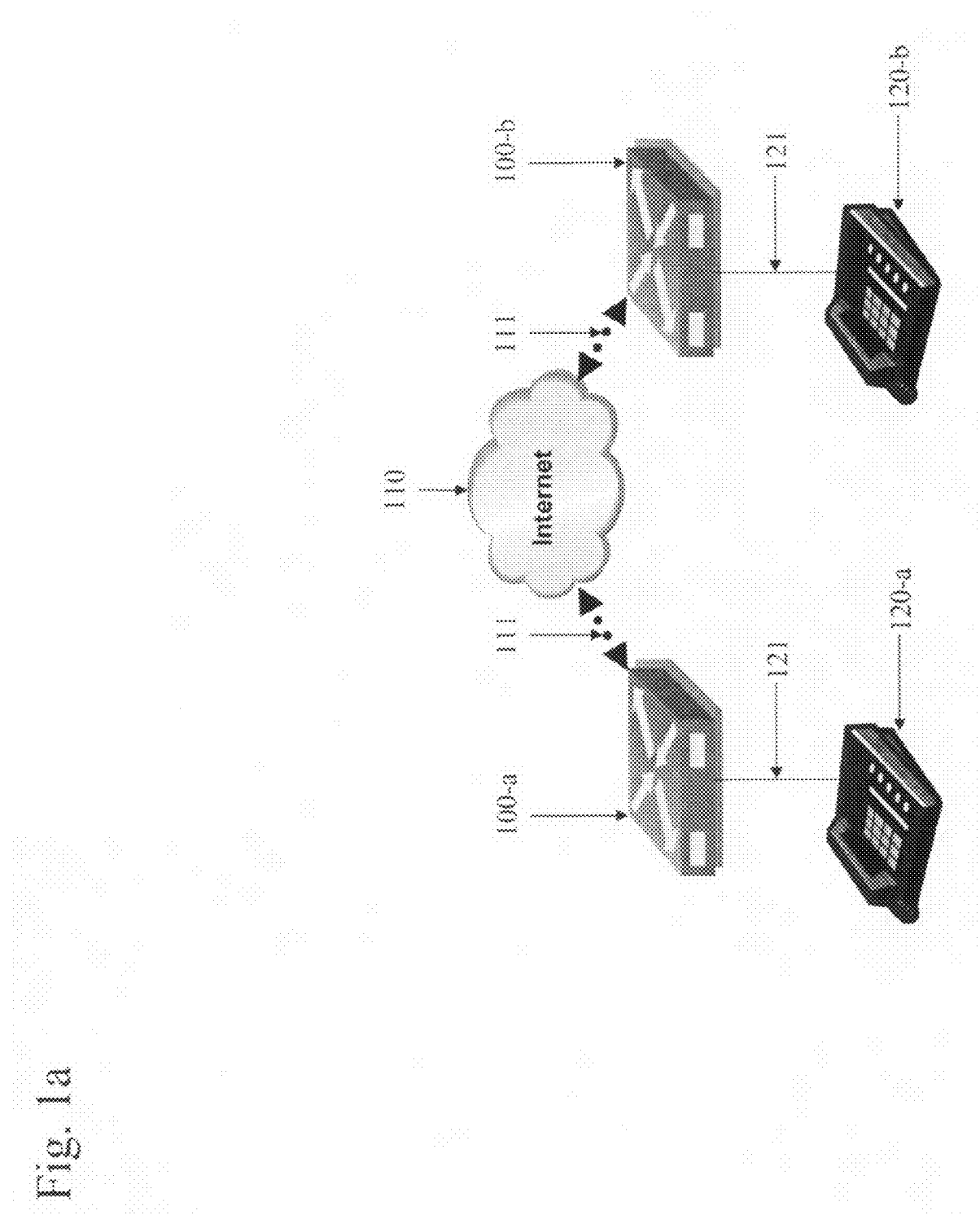
FIG. 1a is a standard view of an end-to-end voice connection using VOIP.

FIGS. 1a-1c and FIGS. 2b-2c illustrate the basic technology and embodiments of the invention which include an input/output device 120-a which transmits a call (including, e.g. sound and/or data) through wire or cable 121 to endpoint 100-a. The endpoint 100-a receives the sound and routing information taken from input/output device 120-a, puts the sound into packets, then routes those packets to proper endpoint 100-b. Packets travel through internet connection 111 to internet backbone 110. Opposite endpoint 100-b receives the packetized sound and converts it from digital packets 140 back into sound signals 130 that may be understood by input/output device 120 transmitting the sound over cable 121.

FIG. 1*a* shows a standard VOIP setup. Sound and routing information may be initiated on an input/output device 120-*a* (such as a telephone or microphone/speaker), which is transmitted via connection line 121 (which may be a Plain Old Telephone Line (POTS) connected to endpoint device 100-*a*, or other connection configuration), which allows the endpoint device 100-*a* to transmit both sound (and/or data) and routing information to endpoint device 100-*b*. VOIP endpoint devices 100-*a* and 100-*b* may be connected via internet links 111 to the internet 110 (which may be a private internet line or a public internet line).

Figure 1B:
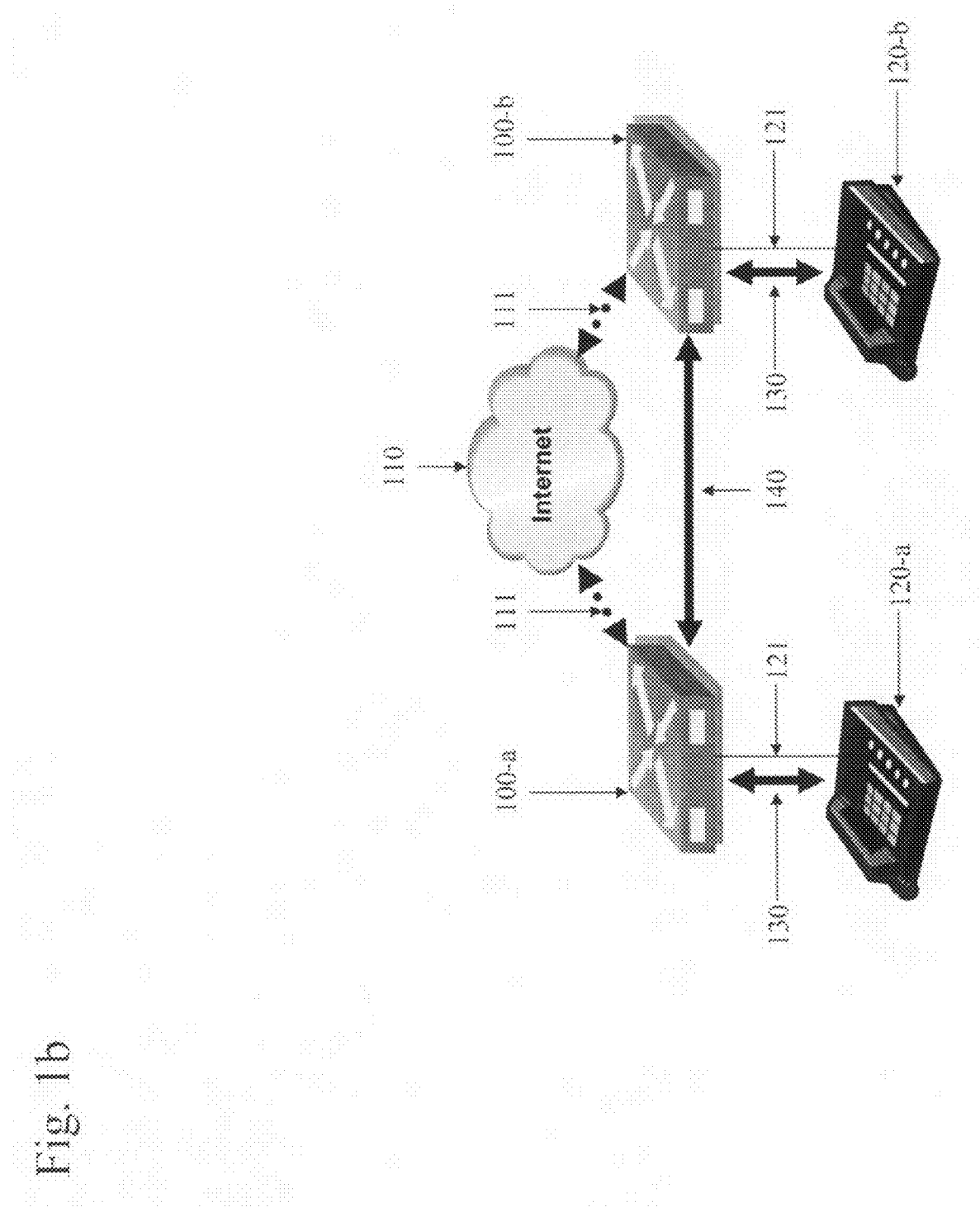
FIG. 1b is a view showing the data flow of a call using VOIP.

FIG. 1*b* shows a standard VOIP setup with the call flow of data- and circuit-based transmission. Sound (and/or data) and routing information is transmitted using circuit-based technology 130 over cable 121. Data packets 140 are sent between endpoint devices 100 via internet links 111 and internet 110.

Figure 2B:
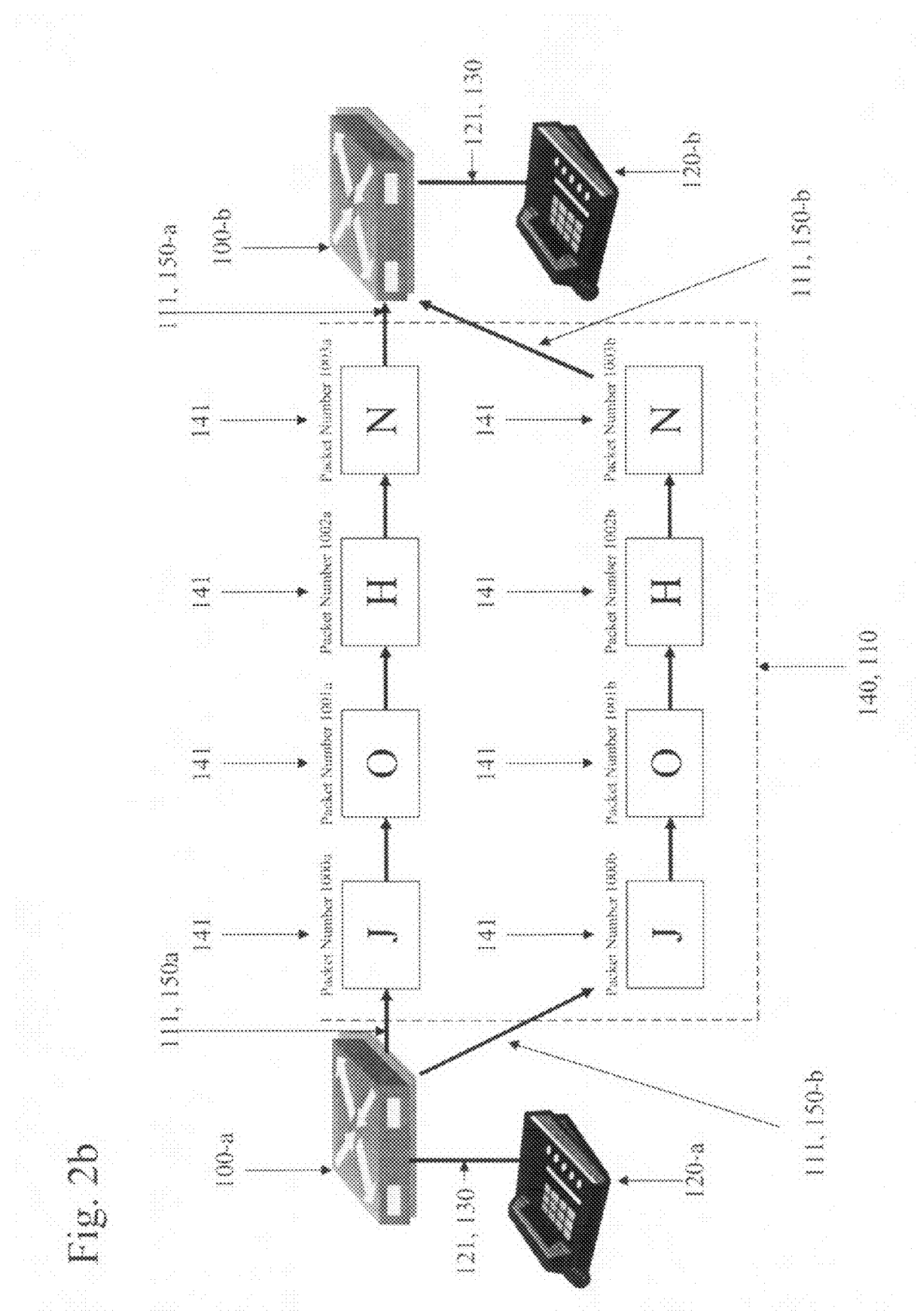
FIG. 2b shows a call flow utilizing multiple network packet replacement.

FIG. 2*a* is a view of a standard transmission of VOIP over a network. The endpoint 100-*c* takes the sound and routing information taken from input device 120-*a* and puts the sound into packets 141 and routes them to an appropriate opposite endpoint 100-*d* via a single packet stream 150. For example, each packet shown in FIGS. 2*a*-2*c* holds inside of it data representing a sound represented by letters of a full word "John." Thus, each packet 140 (Packet Nos. 1000-1003) holds a portion of the sound that the users of device 120 hear when they hear the word "John". Packets 140 travel through internet connection 111 to internet 110. Opposite endpoint 100-*d* then receives the packetized sound and converts it from digital packets 140 back into sound signal 130 that may be understood by input/output device 120-*b* transmitting the sound over cable 121.

FIG. 2*b* is a view of a transmission of VOIP over a network using multiple network packet replacement. Unlike FIG. 2*a*, in FIG. 2*b* there are two call streams 150-*a* and 150-*b* sent by endpoint device 100-*a*. The first call stream 150-*a* may be transmitted via a connection to a first network, and the second call stream 150-*b* may be transmitted via the connection to the first network, or via a connection to a second network. The second call stream 150-*b* is sent in order to create redundancy of packets at endpoint 100-*b*. Network paths to the receiving endpoint 100-*b* may be selected, for example, by designating an IP address of the receiving endpoint 100-*b*, or by using a network relay device. There may be any number of multiple call paths, FIG. 2*b* showing two. Also, based on the configuration selected, for example, by the system, the user or endpoint manufacturer, the second call stream 150-*b* may be sent after a delay period after the first call stream 150-*a* so as not be affected by the bandwidth conditions experienced by the first call stream 150-*a*. The opposite endpoint 100-*b*, in the case of such a delayed transmission, buffers packets 140 in a memory in order to account for the delay.

Figure 2C:
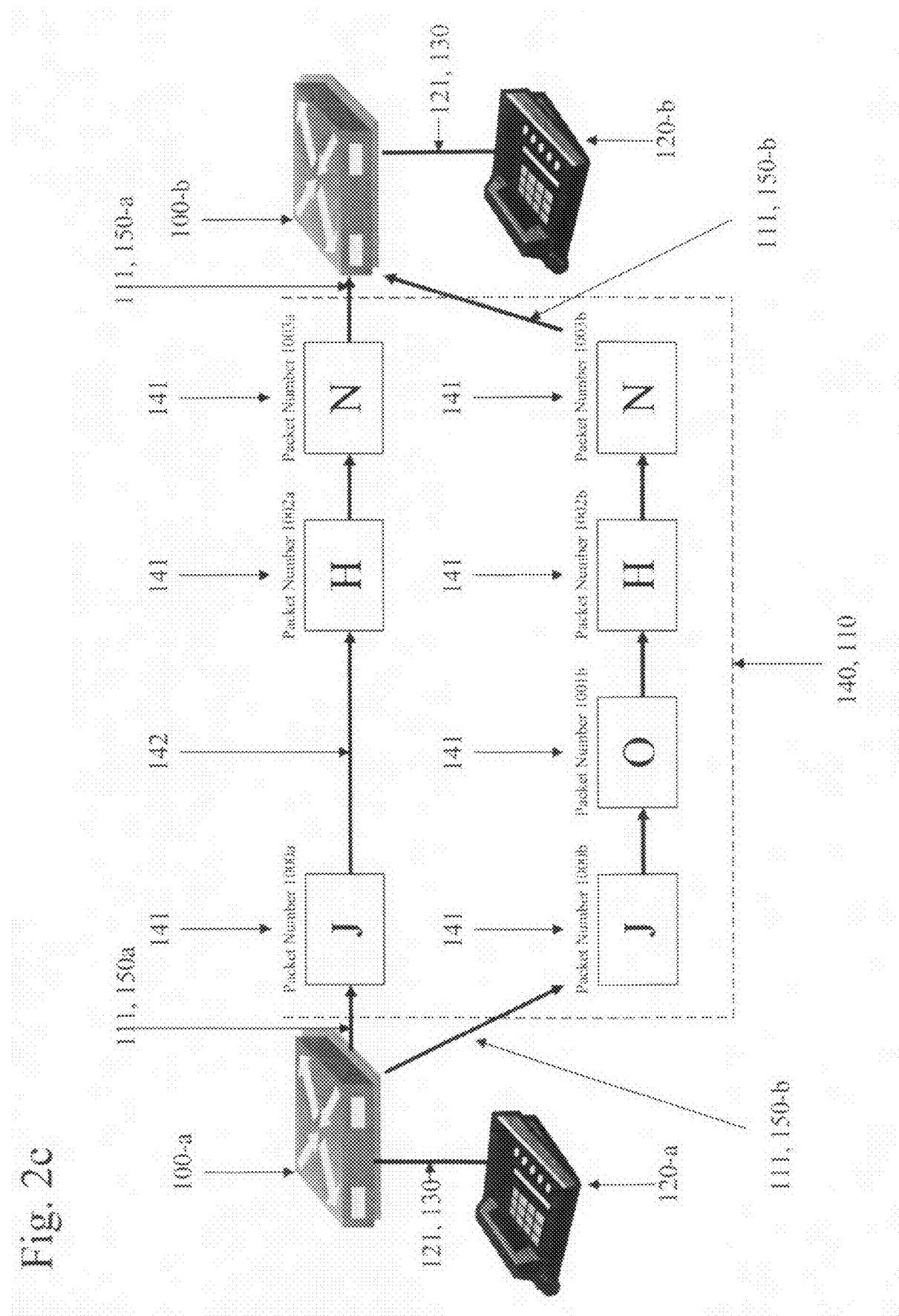
FIG. 2c shows a call flow utilizing packet replacement where a packet in one of the call streams is not delivered.

FIG. 2*c* is a view of a transmission of VOIP over multiple networks using multiple network packet replacement where a packet is lost during transmission from packet loss over the internet 110 and/or internet connection 111. In FIG. 2*c*, a packet 141 in call stream 150-*a* is lost due to packet loss (shown at locations 142). In one aspect, the system will keep a record of the packet numbers of all received packets and discard duplicates of those packets already received.

Endpoint device 100-*b* inserts the redundant packet (Packet No. 1001*b*) from call stream 150-*b* into the appropriate position using packet sequence information within the packets received from call stream 150-*a* (Packets Nos. 1000*a*, 1002*a*, 1003*a*) when converting the packets 141 from digital packets 140 back into sound signal 130 that may be understood by input/output device 120-*b* transmitting the sound over cable 121. FIG. 2*c* thus shows how an embodiment the invention is able to maintain call quality even when packet loss occurs over a networks.

Figure 2D:
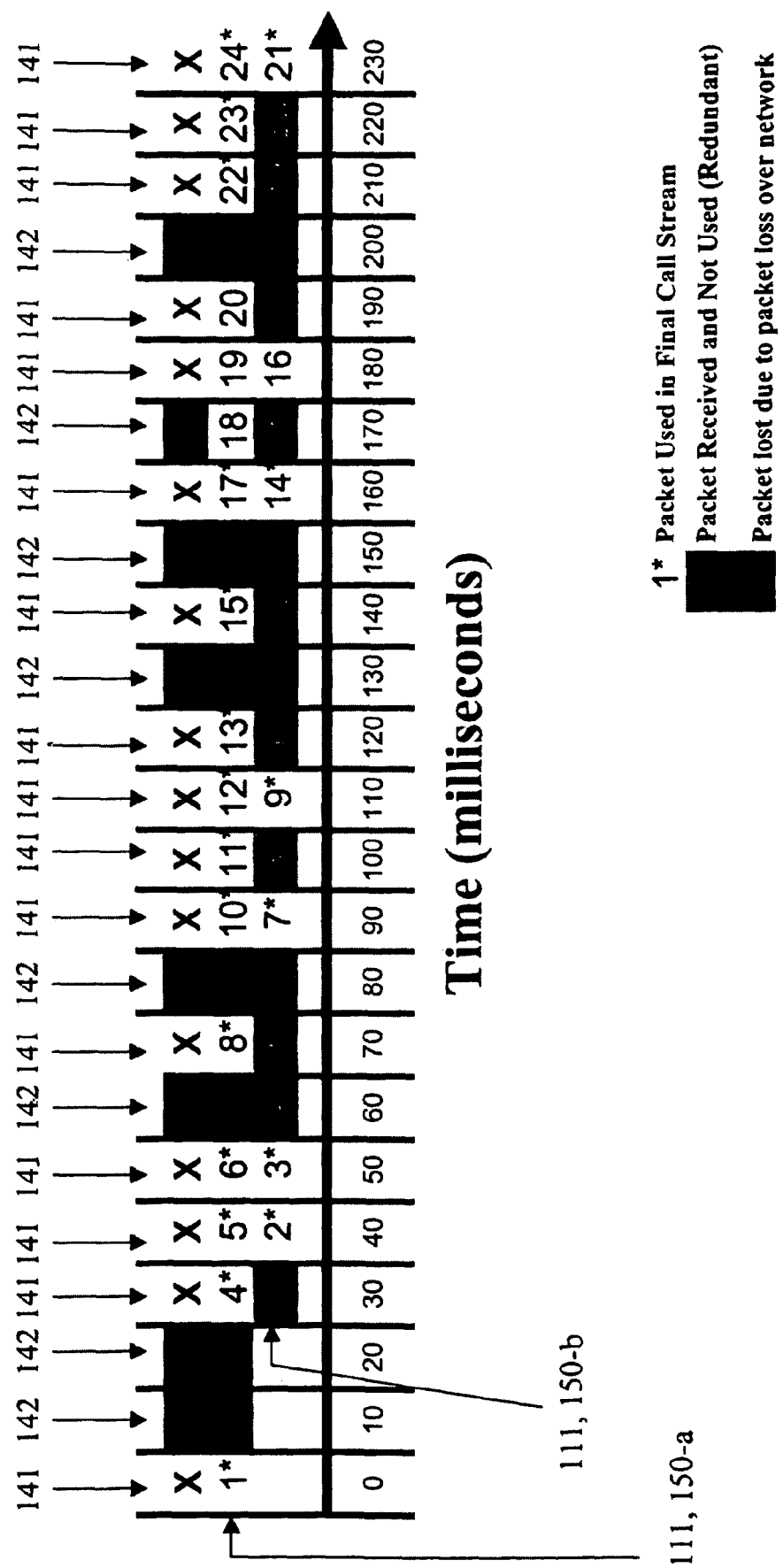
FIG. 2d shows packet transmission over multiple networks using packet replacement.

FIG. 2*d* is a view of packet transmission over multiple IP networks using multiple network packet replacement. FIG. 2*d* shows a type of packet loss where at a given times packets are dropped; however, this is not necessarily how a data network will behave. In fact, the data network may behave in many different ways when dropping packets; this particular scenario is merely an example of the behavior of a given network connection. In FIG. 2*d*, successfully received packets are labeled 141, and lost packets are labeled 142. In the example shown in FIG. 2*d*, packet loss on the network is at 33%, which is calculated by dividing the number (8) of lost packets 142 by the total number (24) of transmitted packets 141, 142 sent through the network. In the example shown in FIG. 2*d*, transmission of the first call stream 150-*a* begins at time 0 ms sending uniquely numbered packets. Transmission of the second call stream 150-*b* begins at time 30 ms after the first call stream 150-*a*. This delay is not required but depending on conditions over the network may assist in increasing quality. A receiving endpoint 100-*b* receives and buffers the incoming packets 141, and may wait for all of the packets in a stream or may wait a preselected time or for a preselected number of packets in a stream to arrive. In FIG. 2*d*, packets marked with an asterisk (*) signify packets that are received at the receiving endpoint 100-*b* and are used in the final call stream. Packets marked with a degree symbol (°) are packets that are lost or damaged in transit. Packets marked with an apostrophe (') are packets that are received and discarded by the receiving endpoint 100-*b* as they are redundant. In one aspect, when assembling the complete packet string, the receiving endpoint 100-*b* uses the first packet that fits into the string sequence (e.g. packets 2* and 3* received in second call stream 150-*b* are used before packet 4* received in the first call stream 150-*a*, even though packets 2* and 3* are received by the receiving endpoint 100-*b* later in time). The receiving endpoint 100-*b* places the packets into their proper positions using sequence information and converts the stream of packets into a sound signal. FIG. 2*d*. thus shows that even with 33% packet loss, the receiving endpoint 100-*b* is able to complete the full stream of packets without any lost data. The example shown in FIG. 2*d* assumes that all streams undergo identical packet loss, but similar scenarios may be constructed where each constituent stream undergoes a different packet loss.

Figure 3:
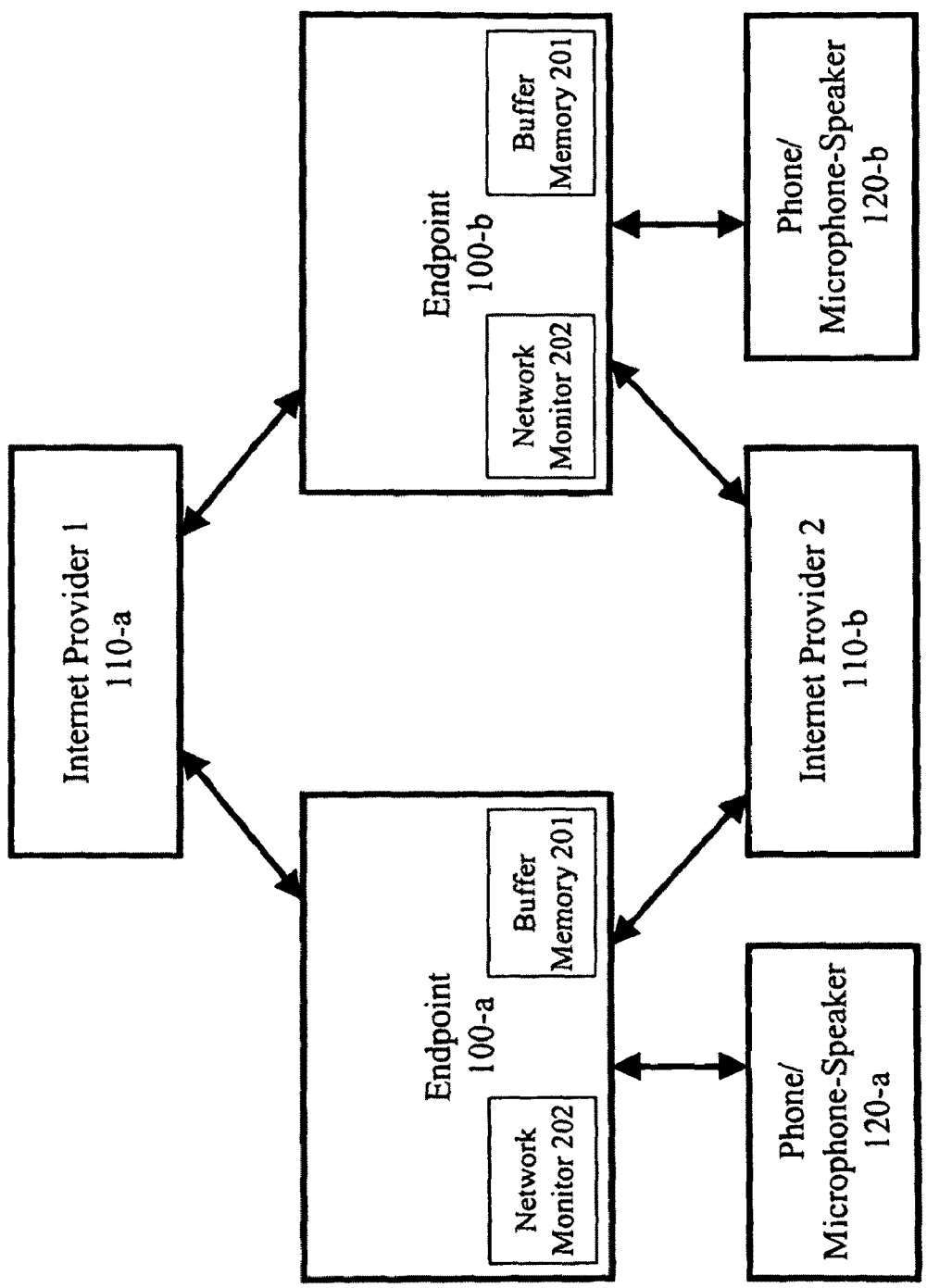
FIG. 3 shows a block diagram showing the interactions of the elements involved in multiple network packet replacement.

FIG. 3 shows a block diagram showing the interactions of the elements involved in multiple network packet replacement. A first input/output device 120-*a* initiates routing instructions and a sound signal which is then passed on to a first endpoint 100-*a*. The first endpoint 100-*a* converts the sound signal into a selected number of packetized call streams and a selected delay time for each stream, which are then transmitted through the internet providers 110-*a* and 110-*b*. A second endpoint 100-*b* receives the multiple call streams, stores them in buffer memory 201 and rebuilds the sound signal. If any packets are missing from one stream, the second endpoint 100-*b* replaces the missing packets from the inventory of the call packets stored from the redundant streams. In one aspect, once a single sound signal is put together with all of the necessary packets, the sound signal is sent to a second input/output device 120-*b*. As noted above, reverse-direction transmission may simultaneously occur between second input/output device 120-*b* and first input/output device 120-*a*.

In one aspect, the system parameters (i.e., number of packets streams, number of networks, and delay time) may be determined on a per-call basis. A network monitor 202, located in one aspect within endpoint 100-a or 100-b, may monitor data from a source and based on that data decide how to use the system most efficiently. For example, based on measurements of network conditions (such as packet loss rate), a network monitor 202 may set up the call with a number of call streams, networks, and offset patterns to create the most ideal conditions for ensuring that at least one of each packet makes it all the way from transmitting endpoint to receiving endpoint. The network monitor 202 or transmitting endpoint 100-a (or 100-b) may begin, modify, delay, or stop sending over multiple streams and/or networks during a call in progress based on real-time network condition data.

The routing intelligence provided by network monitor 202 allows for the system disclosed to be used in the most efficient manner. In one aspect, the network monitor 202 may be implemented in software or hardware. A control or routing may be implemented which may do one or more of the following:

1. Based on the performance of any given network, the routing intelligence may choose how to set up the call. This may include the number of redundant call streams or packets to send and which networks to utilize. The system may also make such decisions during the call.
2. Based on the performance of any given network, the routing intelligence may choose the number of diverse paths over which the redundant packets will be routed.
3. Based on the performance of any given network, the routing intelligence may choose a delay time for the redundant packets to be sent. This may be based on the speed or frequency at which packets are lost, so that the routing intelligence may decide how to ensure that at least one of each packet is transmitted from point A to point B.
4. Based on the performance of any given network, the routing intelligence may choose the number of redundant packets to be sent or the number of call streams to send and which networks to send them over.
5. Based on the performance of any given network, the routing intelligence may choose to stop sending a redundant stream through one of the networks. This may be done because performance of one of the networks is at a level where redundant packets is unnecessary for quality. Or this can be done because a network is operating below any acceptable level and redundant packets sent through that network will not help the overall quality of the call.

The system of the present disclosure may not be limited to VOIP or devices transmitting over the internet. The multiple transmission of streams of information from one point to a final point and then using the excess inventory to create one final stream of information may be used in many different applications. The system may alleviate the need for an endpoint to request back to the start point for a lost piece of information. Various current protocols allow for the recovery of lost packets in that manner, but in real-time applications such as voice, requesting/resending processes require time and signal-processing resources which make them unusable for such applications. In wireless applications (such as cellular phone networks), which typically experience high packet loss, the system of the present disclosure may be used efficiently to increase call quality.

As noted above, in one aspect of the system of the present disclosure, each side of the call (i.e. endpoints) may be configured to use a different number of networks on each side.

The following three scenarios are given as illustrative examples and do not describe prior or current existing systems.

EXAMPLE 1

1 Network Connection to 2 Network Connections

XYZ Corp., located in South Africa, gets internet service in its office through an Internet Service Provider (ISP), which is in turn connected to several different internet backbones, such as MCI and AT&T. XYZ wants to use VOIP to have telephone connectivity with its branch office in Los Angeles, which gets internet service from two different networks, MCI and AT&T. In the Los Angeles office, XYZ connects its telephone service, for example PBX, to an endpoint using the system of the present disclosure, so that an IP address from each network, MCI and AT&T, is put into the endpoint and the endpoint is online to both networks. XYZ's endpoint in South Africa, also using the system of the present disclosure, is configured to send two duplicate call streams, one to each of the two IP addresses corresponding to the two networks connected in Los Angeles. By doing this, XYZ is able to improve communication quality as each packet is sent twice and terminates to two different networks, MCI and AT&T. Each network has different peering points and points of failure along the net, which is why when using two different networks, the chance of both networks experiencing trouble at the same time is unlikely. When a call stream is transmitted to South Africa from Los Angeles, duplicate copies may be transmitted, one over each of the two Los Angeles provider networks to the single South African destination IP address, again increasing the chance of proper packet delivery.

EXAMPLE 2

From 2 Network Connections to 2 Network Connections

XYZ Corp., located in South Africa, gets internet service from both Sprint and Global Crossing. XYZ wants to use VOIP to have telephone connectivity with its branch office in Los Angeles, which gets internet service from both MCI and AT&T. The offices in Los Angeles and South Africa each connect to a endpoint using the system of the present disclosure, so that for each location an IP address from both internet service networks are put into the endpoint, and the endpoint is online to both networks. XYZ's endpoints in South Africa and Los Angeles are configured to send a duplicate call stream to each of the two networks in the opposite location. For example, XYZ in South Africa will send one call stream using Global Crossing to Los Angeles using either MCI or AT&T and will also send a duplicate call stream using Sprint to Los Angeles using the other of MCI and AT&T. By doing this, XYZ is able to improve communication quality as each packet is sent twice and terminates to two different networks. As noted above, each network has different peering points and points of failure along the net, which is why by using two different networks the chance of both networks experiencing trouble at the same time is unlikely.

EXAMPLE 3

From 2 Network Connections to 2 Network Connections, Cross Sending

XYZ Corp., located in South Africa, gets internet service from both Sprint and Global Crossing. XYZ wants to use VOIP to have telephone connectivity with its branch office in Los Angeles. In Los Angeles, the company gets internet service from both MCI and AT&T. In the offices in Los Angeles and South Africa XYZ hooks up a endpoint using the system of the present disclosure so that for each location an IP address from both networks is put into the endpoint and the endpoint is online to both networks. Both endpoints of XYZ in South Africa and Los Angeles are configured to send two call streams from each network to each of the two networks on the opposite side. For example, XYZ in South Africa will send two duplicate call streams using Global Crossing to Los Angeles using both MCI or AT&T and will also send two more duplicate call streams using Sprint to Los Angeles using both MCI and AT&T. Therefore, in this example, there are a total of four call streams. By doing this XYZ is able to improve communication quality as each packet is sent twice from each network to the opposite networks and terminates to two different networks. Each network has different peering points and points of failure along the net which is why by using four different network combinations the chance of all networks experiencing trouble at the same time is unlikely.

It will be understood that the above-described arrangements of apparatus and the methods of operating the same are merely illustrative of applications of the principles of the invention and many other embodiments and modifications may be made without departing from the spirit and scope of the invention.

What is claimed is:

1. A programmed computer for monitoring a network, comprising:
    a memory having at least one region for storing computer executable program code; and
    a processor executing the program code stored in the memory,
    wherein the program code comprises:
        code for monitoring a characteristic of the network;
        code for controlling a network path of two or more redundant call streams sent from a first endpoint to a second endpoint based on the characteristic; and
        code for selecting a delay time for transmission of one of the two or more redundant call streams from the first endpoint based on a number of lost call packets determined at the second endpoint.

2. The programmed computer of claim 1, wherein the code for controlling is performed during a call.

3. The programmed computer of claim 1, wherein the code for controlling includes changing the network path of redundant call streams sent based on a number of lost call packets determined at the second endpoint.

4. A computer program product, comprising a computer usable medium having a computer readable program code embodied therein, the computer readable program code adapted to be executed to implement a network monitoring method, comprising:
    code for monitoring a characteristic of the network;
    code for controlling a network path of two or more redundant call streams sent from a first endpoint to a second endpoint based on the characteristic; and
    code for selecting a delay time for transmission of one of the two or more redundant call streams from the first endpoint based on a number of lost call packets determined at the second endpoint.

5. The computer program product of claim 4, wherein the code for controlling is performed during a call.

6. The computer program product of claim 4, wherein the code for controlling includes changing the network path of redundant call streams sent based on a number of lost call packets determined at the second endpoint.

* * * * *